United States Patent
Fischer et al.

(10) Patent No.: US 8,880,859 B2
(45) Date of Patent: Nov. 4, 2014

(54) METHOD AND ARRANGEMENT FOR CONFIGURING ELECTRONIC DEVICES

(75) Inventors: Kai Fischer, Baldham (DE); Klaus-Josef Kunte, Borchen (DE); Viktor Ransmayr, München (DE); Katrin Vahldiek, Forstinning (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 843 days.

(21) Appl. No.: 13/120,521

(22) PCT Filed: Sep. 29, 2009

(86) PCT No.: PCT/EP2009/007004
§ 371 (c)(1),
(2), (4) Date: Jun. 6, 2011

(87) PCT Pub. No.: WO2010/037525
PCT Pub. Date: Apr. 8, 2010

(65) Prior Publication Data
US 2011/0264900 A1    Oct. 27, 2011

(30) Foreign Application Priority Data
Sep. 30, 2008  (DE) .......................... 10 2008 049 722

(51) Int. Cl.
*G06F 9/24* (2006.01)
*G06F 15/177* (2006.01)
*G06F 21/34* (2013.01)
*G06F 21/62* (2013.01)

(52) U.S. Cl.
CPC ............ *G06F 21/6209* (2013.01); *G06F 21/34* (2013.01)

USPC ....... 713/1; 713/2; 713/100; 380/28; 380/277

(58) Field of Classification Search
CPC ....... G06F 21/10; G06F 21/64; G06F 21/575; G06F 21/00
USPC .............................. 713/1, 2, 100; 380/28, 277
See application file for complete search history.

(56) References Cited

U.S. PATENT DOCUMENTS 6,192,436 B1   2/2001  Jacobson et al.
2001/0015919 A1  8/2001  Kean
(Continued)

OTHER PUBLICATIONS

Written Opinion of the International Searching Authority for PCT/EP2009/007004 dated Feb. 26, 2010 (Form PCT/ISA/237) (English Translation).

(Continued)

*Primary Examiner* — Michael J Brown
(74) *Attorney, Agent, or Firm* — Buchanan Ingersoll & Rooney PC

(57) ABSTRACT

The invention relates to a method for configuring electronic devices, particularly terminals, wherein during configuration at least parts of first configuration data on a chip card are fed to an electronic device, wherein the configuration data are stored on the chip card as second configuration data such that the stored data are the result of an obfuscation following at least one first algorithm. Furthermore, at least parts of the first algorithm can be derived by the electronic device. The stored second configuration data are subjected to a de-obfuscation by the device such that, having knowledge of the first algorithm, they can be reconstructed as first configuration data and the configuration of the terminal can be based thereon. The invention further relates to an arrangement having means for carrying out the method.

19 Claims, 1 Drawing Sheet

(56) References Cited

U.S. PATENT DOCUMENTS

2001/0032318 A1   10/2001   Yip et al.
2003/0140221 A1*   7/2003   Garnett .............................. 713/1
2006/0048222 A1   3/2006   O'Connor et al.

OTHER PUBLICATIONS

International Preliminary Report on Patentability for PCT/EP2009/007004 dated Apr. 5, 2011 (Form PCT/IB/373, PCT/ISA/237) (German Translation).
International Preliminary Report on Patentability for PCT/EP2009/007004 dated Apr. 5, 2011 (Form PCT/IB/373, PCT/ISA/237) (English Translation).
International Search Report for PCT/EP2009/007004 dated Feb. 26, 2010 (Form PCT/ISA/210) (German Translation).
International Search Report for PCT/EP2009/007004 dated Feb. 26, 2010 (Form PCT/ISA/210) (English Translation).
Written Opinion of the International Searching Authorityfor PCT/EP2009/007004 dated Feb. 26, 2010 (Form PCT/ISA/237) (German Translation).
Schneier B Ed—Schneier B: "Applied cryptography, second edition: protocols, algorithms, and source code in C" Jan. 1, 1996, Applied Cryptography : Protocols, Algorithms, and Source Code in C, New York, NY : John Wiley & Sons, US, pp. 28-29,169 , XP002985121 ISBN: 9780471128458 Section 9.3.
Cisco Systems: "Using eToken with Cisco IOS Software Release 12.3(14)T" Internet citation, [Online] Jan. 1, 2007, pp. 1-10, XP002568096 found in Internet: URL:http://www.cisco.com/en/US/prod/collateral/modules/ps6247/prod_white_paper0900aecd80275112.pdf>.
Cisco Systems: "USB eToken and USB Flash Features Support" Internet citation, [Online] Jan. 1, 2007, XP002568097 found in Internet: URL:http://www.cisco.com/en/US/prod/collateral/modules/ps6247/product_data_sheet0900aecd80232473.pdf>.

* cited by examiner

METHOD AND ARRANGEMENT FOR CONFIGURING ELECTRONIC DEVICES

CROSS-REFERENCE TO RELATED APPLICATIONS

This application is the United States national phase under 35 U.S.C. §371 of PCT International Application No. PCT/EP2009/007004 filed on Sep. 29, 2009, and claiming priority to German Application No. 10 2008 049 722.3 filed Sep. 30, 2008.

BACKGROUND OF THE INVENTION

1. Field of the Invention

Embodiments relate to methods for configuring electronic devices, particularly terminals, and an arrangement for configuring electronic devices, particularly terminals.

2. Background of the Related Art

The use of plastic cards with integrated chips, also called "smart cards," is generally known. Normally, the owner of such a card has access to areas or data which are accessible only to a limited circle of persons, particularly only one specific person. These cards contain data which are needed for this function and are therefore considered sensitive data or secret data.

For this reason, such chip cards usually contain both a private data sector, which can only be accessed after a successful authentication, e.g. the input of a "personal identification number" (PIN) or a biometric authentication, and a public sector, which is accessible even without authentication.

However, smart cards are also used to automatically configure and customize products and systems. For this purpose, configuration data are stored in the data storage memory of the smart card, with sensitive data stored in a similar manner in the secured private sector.

US 2001/00 15 19 A1 describes a secure configuration of a remote-programmable gate array, wherein the configuration data are encrypted and stored on an external memory chip.

U.S. Pat. No. 6,192,436 B1 describes the configuration of an electronic device, wherein the configuration data are stored on a smart card.

This approach has the disadvantage that when the system is fully automated and is to be configured without any user action, e.g., because the system lacks an appropriate interface to enter a PIN, the configuration data still have to be protected.

This is the case, for instance, with the Siemens Hosted scenarios and BiaB (Band in a Box), where first of all a web server must be set up in the system, so that a PIN can be entered via the web browser. Setting up the web server, in turn, requires configuring various subsystems using passwords and shared secrets. If the configuration data are stored in the public sector of the smart card, there is a risk that, if the card is lost, e.g., during transport or in the customer's environment, sensitive data can be read and compromised.

Problems arise, too, when the product or system has to be (pre)configured first so that authentication of the smart card becomes possible.

BRIEF SUMMARY OF THE INVENTION

Embodiments of the invention aim to provide a method and arrangement which will overcome the disadvantages of the current state of the technology.

This task is achieved by the method for configuring electronic devices, wherein during configuration at least parts of the first configuration data on a chip card are fed to an electronic device, particularly a terminal. This task is further achieved with the arrangement for configuring electronic devices, particularly terminals, wherein during configuration at least parts of the first configuration data on a chip card are fed to an electronic device.

BRIEF DESCRIPTION OF THE FIGURES

Shown in FIG. 1a is a simplified schematic of the obfuscation process according to an embodiment of the invented solution and an arrangement for carrying it out.

DETAILED DESCRIPTION OF THE INVENTION

Figure 1A:
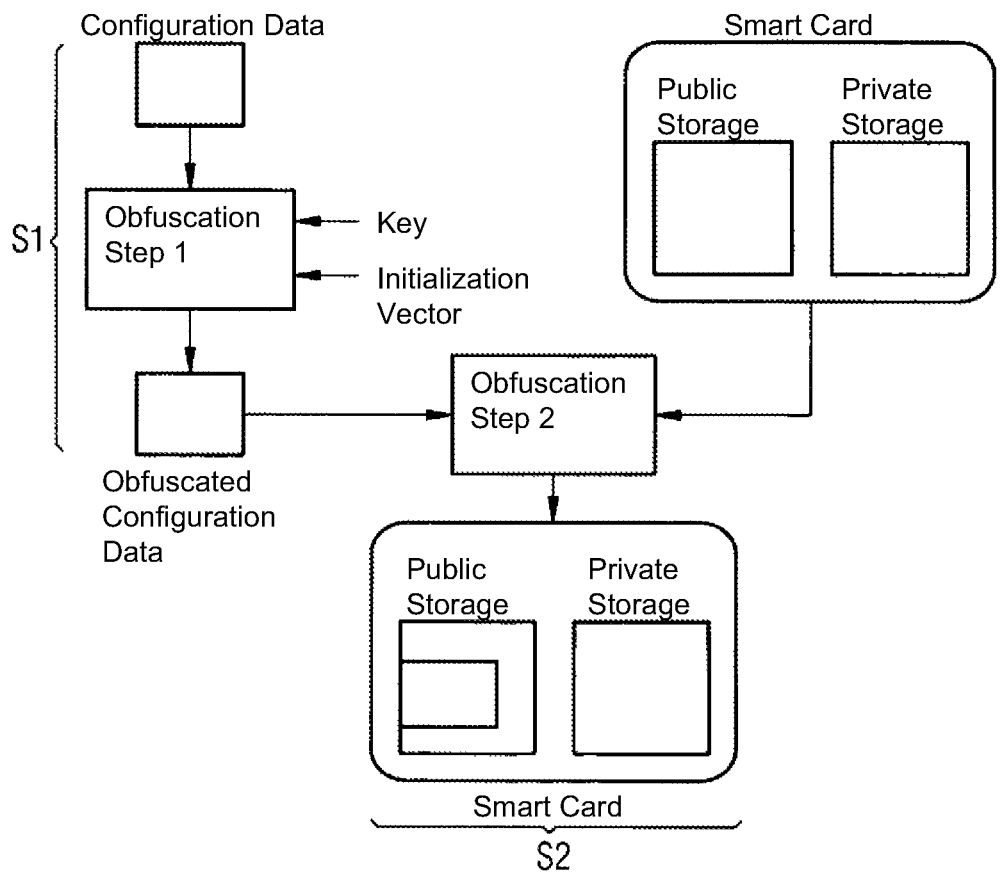
FIG. 1b is a simplified schematic of the de-obfuscation process according to an embodiment of the invented solution and an arrangement for carrying it out.

Embodiments of the invention relate to a method for configuring electronic devices, particularly terminals, wherein at least parts of the first configuration data on a chip card are fed to a terminal, wherein the configuration data are stored on the chip card as second configuration data in such a way that the stored data are the result of at least one obfuscation following at least one first algorithm. Furthermore, at least parts of the first algorithm can be derived by the electronic device and the stored second configuration data are subjected to de-obfuscation by the device in such fashion that having knowledge of the first algorithm, they can be reconstructed as first configuration data and the configuration of the terminal can be based thereon.

An advantageous further development of the invention is that the derivation occurs based on a first secret stored in the terminal by the first algorithm. This increases the effort needed for unauthorized third parties to find the true semantics of the data, since they usually have only limited or no access to the terminal.

Preferably, the first secret is an encryption key, particularly a symmetrical one. This means an additional increase in effort needed and an increase in security, since such keys cannot be found by simply guessing and cannot be deduced through semantic relations using, for instance, names or (birth) dates.

The derivation based on a second secret used by the first algorithm constitutes an advantageous further development, wherein, should the first secret have been found or discovered by an unauthorized third party, another hurdle has been installed.

As the second secret, the use of an initialization vector is preferred.

If a second algorithm is implemented in the electronic device, which detects the second secret, security is improved, since nobody has to assign secrets to the terminals. The only party involved is the one giving out the chip cards. This means one less point of vulnerability for intercepting and de-crypting of the secret.

This is particularly advantageous when the invented method is further developed in such a way that the second secret is found based on at least one piece of information stored on the chip card.

Alternatively or in addition, the invented method can be further developed in such a way that the second secret is found based on an attribute of the chip card.

As an alternative or as an addition, the second secret can be stored on the terminal.

The arrangement according to the invention for configuring terminals, wherein during configuration at least parts of first configuration data are fed to an electronic device, is characterized by means to carry out the method or one of its further developments, thus contributing by offering an implementation that applies the advantages of the invention.

The invention with its further developments offers advantages over known solutions using the current state of technology, e.g. the solution wherein sensitive data are always stored in the private data sector of a smart card, which indeed offers the highest security since the data can only be read after input of a successful authentication, but which is not suited for all application scenarios, or, for instance, a solution wherein a temporary configuration is stored in the public sector of the smart card, which is then overwritten following successful authentication by the configuration in the private sector, which is, however, not usable for all data and configurations at all times. Furthermore, this solution does not allow any automated configuration without user input.

The nature of embodiments of the invented solution is such that sensitive data are stored in the public sector of the smart card in such a way that they are transformed by obfuscation.

Data obfuscation, in this case, means the transformation of data with the goal of making the detection of semantics and data contents more difficult, while at the same time maintaining the essential data. The process that reverses this procedure is called de-obfuscation.

Embodiments of the invention thus prevent sensitive data on the public sector of the smart card from being read using the currently known methods to attack such data.

The quality of an obfuscation in this case is measured by the effort required for its de-obfuscation. Using an encryption key according to the further development of the invention, wherein records are encrypted with a special symmetrical key and/or an initialization vector, increases the effort tremendously.

In this case, the initialization vector, according to the further developments, can be stored with the data or can be derived from an attribute of the smart card.

Data which have been obfuscated in such manner are stored on the smart card and are not readable without knowledge of the key. The system which is to be configured by the smart card also contains the symmetrical key and is able to de-obfuscate the data after identification of the initialization vector.

One especially advantageous further development of the invention is storage of additional dummy records, especially with random numbers or other random data, in addition to the obfuscated sensitive data. This has the advantageous effect that the concrete storage location of the data is disguised.

Another advantageous further development of the invention is dissolving or generating data structures, so that multiple individual data are collected and the large data object is alternatively or additionally split into several smaller parts. This structural change also increases the effort required for unauthorized third parties to read the data.

Overall it is possible to store sensitive data and data that need to be secured in the public data storage memory of a smart card and at the same time guarantee protection against the data being compromised. Data for automatic execution control, such as configuration and customization, can be stored in the public sector of the smart card and still be secured, without any limitation of the completely automated execution, such as input of a PIN by the user.

The method of the invented solution does not require any modification or new construction of the widely used large quantities of smart cards and smart card readers, or of the products and systems that use smart cards.

An advantage of embodiments of the invention is such that, without knowledge of the symmetrical key, the obfuscated data cannot be recognized or could be recognized only with an extremely large expenditure of time and resources.

Figure 1B:
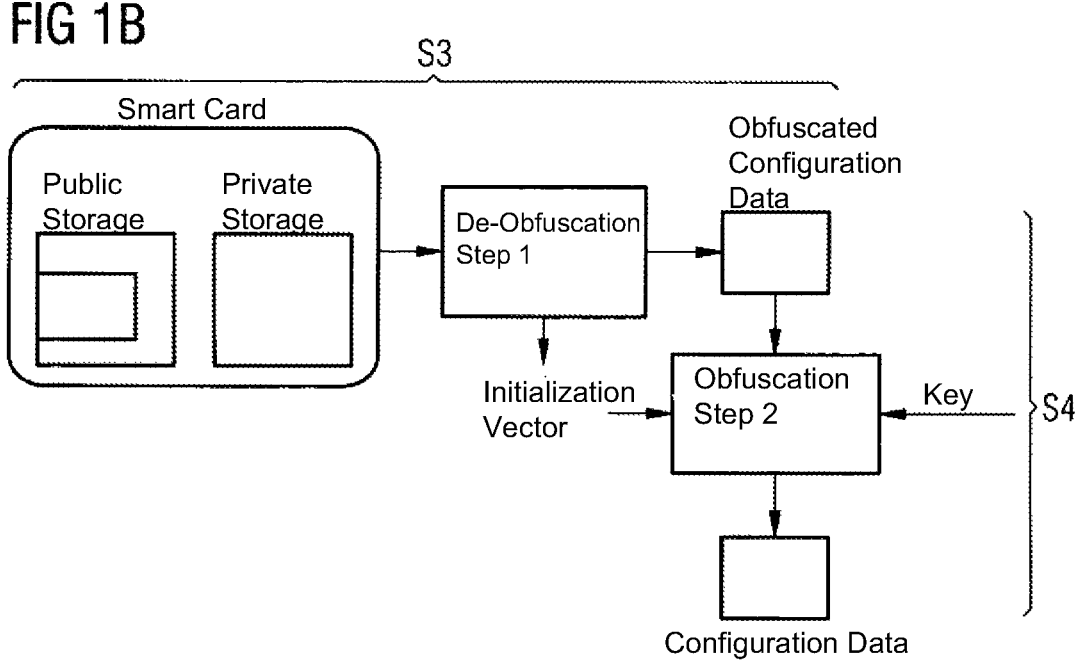

Additional advantages and details about the invention are explained using the exemplary embodiments of the invention shown in FIGS. 1a and 1b.

FIG. 1a contains simplified configuration data shown as a data block, which in a first step S1 are undergoing obfuscation according to the invention.

This occurs according to the embodiment based on an encryption key and an initialization vector. The schematic shows this in such a way that the data, the key, and the vector are fed into the obfuscation process.

The result of this process is obfuscated configuration data. These data are stored in a second step S2 on a smart card, wherein they are saved in the public sector of the smart card.

In the second step S2, a second level of obfuscation can be implemented, consisting of resolving the structure of the obfuscated data and saving them in a structure that is different from their original structure in the storage memory.

Furthermore, the second step may alternatively or additionally consist of the fact that more data may be added to the obfuscated data which do not contribute to semantics or function of the configuration data but which add another hurdle for recognition of the actual contents.

The smart card which was manipulated this way in the second step S2 can now serve as the basis for a configuration.

Within the framework of the configuration, as shown in the schematic in FIG. 1b, in a third step S3, the smart card, which has been prepared for its purpose to execute a configuration, accesses the stored obfuscated data, and the initialization vector is extracted from the first level of de-obfuscation.

Then, in a fourth step S4, the obfuscated configuration data and the initialization vector are led to a second level of the process, the de-obfuscation. Furthermore, an encryption key is added to the de-obfuscation process. This key can already be stored on the smart card or, as an alternative or addition, it can be partially or completely identified with an algorithm known to the authorized user based on unique card characteristics, and the encryption can be reversed.

After completion of this step, the de-obfuscated data are available to carry out the configuration.

The invention claimed is:

1. A method for configuring an electronic device, wherein during configuration at least parts of configuration data on a chip card are fed to the electronic device, the method comprising:
   a) obfuscating first configuration data by encrypting the first configuration data in accordance with a first algorithm to transform the first configuration data into second configuration data having a first structure;
   b) further obfuscating the second configuration data by resolving the first structure of the second configuration data to save the second configuration data in a second structure that is different from the first structure;
   c) saving the second configuration data in the second structure in non-transitory storage memory of the chip card;
   d) subjecting the stored second configuration data to de-obfuscation to reverse the encryption of the second configuration data to transform the second configuration data into the first configuration data; and
   configuring the electronic device based on said first configuration data after the second configuration data is subjected to the de-obfuscation and is transformed into the first configuration data.

2. The method of claim 1, wherein the further obfuscating of the second configuration data comprises adding dummy records to the second configuration data.

3. The method of claim 1, wherein the obfuscating of the first configuration data by encrypting the first configuration data in accordance with a first algorithm is based on a first key and a first initialization vector; and wherein subjecting the stored second configuration data to de-obfuscation to reverse the encryption of the second configuration data comprises deriving the first initialization vector from the stored second configuration data and subsequently using the first initialization vector to reverse the encryption of the second configuration data.

4. The method of claim 3, wherein the first key is a symmetrical encryption key.

5. The method of claim 3, comprising:

storing the first initialization vector in the non-transitory storage memory of the chip card.

6. The method of claim 3, comprising implementing in the electronic device a second algorithm, which is performed by the electronic device to identify the first initialization vector.

7. The method of claim 3, comprising identifying the first initialization vector based on at least one piece of information stored on the chip card.

8. The method of claim 3, comprising detecting the first initialization vector based on at least one attribute of the chip card.

9. The method of claim 3, comprising storing the first initialization vector on the electronic device.

10. A system for configuring a terminal, wherein during configuration of the terminal at least parts of first configuration data on a chip card are fed to the terminal, the system comprising:

a terminal, said terminal comprising a card reader;

a chip card storing configuration information in non-transitory memory of the chip card for configuring the terminal, said configuration information being encrypted in accordance with a first algorithm based on a first key and a first initialization vector and being stored in a first structure;

the terminal being configured to de-obfuscate the encrypted configuration information stored on the chip card to derive the first initialization vector and reverse the encryption of the configuration information based on the derived initialization vector for access to the configuration information for configuration of the terminal.

11. A method for configuring a terminal, the method comprising:

obfuscating first configuration data by an encryption of the first configuration data in accordance with a first algorithm based on a first key and a first initialization vector to transform the first configuration data into second configuration data having a first structure;

further obfuscating the second configuration data by resolving the first structure of the second configuration data to save the second configuration data in a second structure that is different from the first structure;

adding dummy records to the second configuration data;

saving the second configuration data in the second structure with the added dummy records in a public data section of a non-transitory storage memory of a chip card;

de-obfuscating the second configuration data stored in the public data section of the non-transitory storage memory of the chip card to reverse the encryption of the second configuration data to transform the second configuration data into the first configuration data; and configuring the terminal based on the first configuration data after the second configuration data is de-obfuscated to be transformed into the first configuration data.

12. The method of claim 11, wherein the de-obfuscating of the second configuration data comprises:

deriving the first initialization vector by the terminal after the terminal accesses the second configuration data stored on the chip card, reversing the encryption of the second configuration data by the terminal based on the derived first initialization vector and an encryption key.

13. The method of claim 12, wherein the encryption key used during the reversing of the encryption of the second configuration data by the terminal is stored in the terminal and is symmetrical with the first key.

14. The method of claim 12, wherein the first structure is a single file and the second structure is a plurality of files that include the added dummy records.

15. The method of claim 14, wherein the dummy records are comprised of random numbers or random data.

16. The method of claim 11, wherein the de-obfuscating of the second configuration data comprises:

deriving the first initialization vector by the terminal after the terminal accesses the second configuration data stored on the chip card, identifying, by the terminal, the first algorithm, and reversing the encryption of the second configuration data by the terminal based on the identified first algorithm.

17. The method of claim 16, wherein an entirety of the first algorithm is identified by the terminal during the de-obfuscating of the second configuration data.

18. The method of claim 16, wherein the first structure is a single file and the second structure is a plurality of files that include the added dummy records.

19. The method of claim 18, wherein the dummy records are comprised of random numbers or random data.

* * * * *